United States Patent [19]

Yamamoto et al.

[11] Patent Number: 4,831,900
[45] Date of Patent: May 23, 1989

[54] SYSTEM FOR CONTROLLING RATE OF SPEED CHANGE IN AUTOMATIC TRANSMISSION

[75] Inventors: Koichi Yamamoto, Hiroshima; Fumiaki Baba, Higashihiroshima, both of Japan

[73] Assignee: Mazda Motor Corporation, Hiroshima, Japan

[21] Appl. No.: 31,612

[22] Filed: Mar. 30, 1987

[30] Foreign Application Priority Data

Apr. 1, 1986 [JP] Japan .................. 61-75697

[51] Int. Cl.$^4$ ............................. B60K 41/06
[52] U.S. Cl. ........................ 74/869; 74/867
[58] Field of Search ............... 74/867, 868, 869, 865, 74/866; 364/424.1

[56] References Cited

U.S. PATENT DOCUMENTS

| 4,462,278 | 7/1984 | Murakami et al. | 74/867 X |
| 4,513,639 | 4/1985 | Hiramatsu | 74/869 X |
| 4,558,612 | 12/1985 | Shimizu et al. | 74/869 X |
| 4,580,466 | 4/1986 | Iwanaga | 74/868 |
| 4,607,542 | 8/1986 | Sugano | 74/869 |
| 4,665,776 | 5/1987 | Sugano | 74/867 |

FOREIGN PATENT DOCUMENTS

| 59-183160 | 10/1984 | Japan . | |
| 59-197649 | 11/1984 | Japan | 74/869 |
| 61-13051 | 1/1986 | Japan | 74/869 |
| 61-124754 | 6/1986 | Japan | 74/869 |
| 2061422 | 5/1981 | United Kingdom | 74/869 |

Primary Examiner—Dwight G. Diehl
Attorney, Agent, or Firm—Gerald J. Ferguson, Jr.

[57] ABSTRACT

A control system for an automatic transmission employed in a vehicle comprises a torque converter coupled with an engine, power transmitting gear arrangement disposed at an output end of the torque converter, a speed change mechanism for giving rise to speed change in the power transmitting gear arrangement, a fluid servo control device having an applying chamber and a releasing chamber to each of which a fluid is supplied and operative to cause the speed change mechanism to work, and an additional control device for controlling the fluid servo control device under a situation in which the fluid in the releasing chamber of the fluid servo control device is so controlled as to have one of speeds in the power transmitting gear arrangement. The fluid servo control device is controlled by the additional control device to be in a first condition wherein the fluid is supplied to the applying chamber and in a second condition wherein the fluid is drained from the applying chamber selectively in response to the operating condition of the engine or the travelling condition of the vehicle.

8 Claims, 2 Drawing Sheets

SYSTEM FOR CONTROLLING RATE OF SPEED CHANGE IN AUTOMATIC TRANSMISSION

BACKGROUND OF THE INVENTION

1. Field of the Invention

The present invention relates generally to control systems for automatic transmissions employed in vehicles, and more particularly, to a system for controlling an automatic transmission provided in a vehicle to have a speed position selected automatically in accordance with the operating condition of an engine employed in the vehicle and the travelling condition of the vehicle.

2. Description of the Prior Art

There has been commonly used in vehicles an automatic transmission which comprises a torque converter coupled with an output shaft of an engine, a power transmitting gear arrangement including a planetary gear mechanism connected to an output shaft of the torque converter, a speed change mechanism including clutch and brake elements and operative to switch over power transmitting paths from one to another in the power transmitting gear arrangement so that speed change is carried out, a hydraulic servo control device provided in an oil hydraulic control circuit for causing the speed change mechanism to work, and a valve arrangement for controlling an operation oil to be supplied to and drained from the speed change mechanism and the hydraulic servo control device. The valve arrangement is operative to cause the hydraulic servo control device to act on the speed change mechanism in response to the operating condition of the engine and the travelling condition of the vehicle, so that the speed change mechanism works to switch over the power transmitting paths from one to another in the power transmitting gear arrangement under the control by the hydraulic servo control device.

For such an automatic transmission employed in the vehicle, it is desired that the shock of great degree, which may arise on the occasion of, for example, a kick-down operation in which the speed is shifted down in the power transmitting gear arrangement, is avoided and in addition a superior responsibility for speed changes is obtained. For fulfilling these desires, it is required that the timing of each speed change is adjusted appropriately in accordance with the operating condition of the engine and the travelling condition of the vehicle.

In view of this, for example, as disclosed in the Japanese patent application published before examination under publication number 59/183160, there has been proposed a control device for an automatic transmission in which a control valve mechanism for controlling the velocity of an oil flowing into or from a hydraulic servo control device which has an applying chamber and a releasing chamber to each of which an oil is supplied and is operative to cause a speed change mechanism comprising friction elements to work for changing a power transmitting path in a power transmitting gear arrangement, so as to control the acting speed of the hydraulic servo control device, is provided with the intention of adjusting the timing of each speed change caused by the speed change mechanism in response to the operating condition of an engine. However, although the acting speed of the hydraulic servo control device is influenced by the presence or absence of oil pressure in the applying chamber, such a fact has not been taken into consideration in the previously proposed control device. Therefore, the previously proposed control device has failed to realize the anticipated result.

OBJECTS AND SUMMARY OF THE INVENTION

Accordingly, it is an object of the present invention to provide a control system for an automatic transmission which avoids the aforementioned problems encountered with the prior art.

Another object of the present invention is to provide a control system for an automatic transmission employed in a vehicle, wherein the shifting-down in a power transmitting gear arrangement is so performed on the occasion of, for example, a kick-down operation that the shock can be effectively moderated.

A further object of the present invention is to provide a control system for an automatic transmission employed in a vehicle, wherein the acting speed of a fluid servo control device which is operative to cause a speed change mechanism to work for switching over power transmitting paths from one to another in power transmitting gear arrangement is controlled appropriately in accordance with the operating condition of an engine with which the control system is coupled and the travelling condition of the vehicle.

According to the present invention, there is provided a control system for an automatic transmission employed in a vehicle comprising a torque converter coupled with an output shaft of an engine, a power transmitting gear arrangement disposed at an output end of the torque converter, a speed change mechanism for changing over power transmitting paths to one from another in the power transmitting gear arrangement to give rise to speed change, a fluid servo control device having an applying chamber and a releasing chamber to each of which a fluid is supplied and operative to act on the speed change mechanism, and an additional control device for causing the fluid servo control device to be in a first condition wherein the fluid is supplied to the applying chamber and in a second condition wherein the fluid is drained from the applying chamber selectively in response to at least one of the operating condition of the engine and the travelling condition of the vehicle during a period in which the fluid in the releasing chamber of the fluid servo control device is so controlled as to have one of speeds in the power transmitting gear arrangement.

With the control system for an automatic transmission thus constituted in accordance with the present invention, when the fluid is drained from the releasing chamber of the fluid servo control device so as to conduct a speed change of shifting down in the power transmitting gear arrangement, the applying chamber of the fluid servo control device has been previously set to be in one of the first and second conditions in accordance with at least one of the operating condition of the engine and the travelling condition of the vehicle. This results in that the acting speed of the fluid servo control device which is appropriate for the operating condition of the engine and the travelling condition of the vehicle is automatically obtained on the occasion of the speed change of shifting down and consequently the timing of the speed chage caused by the speed change mechanism is properly and accurately adjusted so that the speed change is so performed that the shock can be effectively moderated.

The above, and other objects, features and advantages of the present invention will become apparent from the following detailed description which is to be read in conjunction with the accompanying drawings.

DESCRIPTION OF THE PREFERRED EMBODIMENTS

The invention will now be desribed by way of example with reference to the accompanying drawings.

Figure 1:
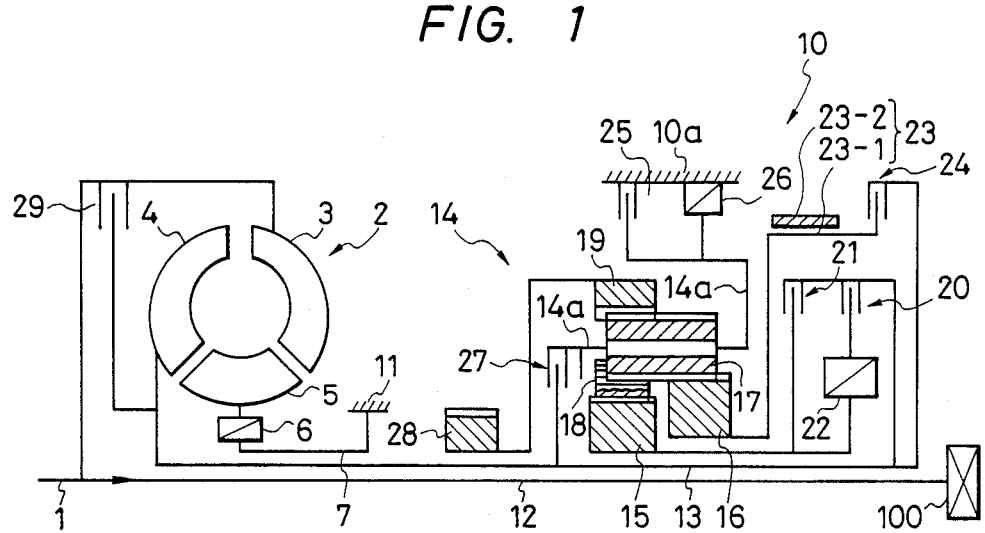
FIG. 1 is a schematic illustration showing an example of an automatic transmission to which one embodiment of control system for an automatic transmission according to the present invention is applied.

Referring to FIG. 1, an automatic transmission employed in a vehicle comprises a torque converter 2 coupled with a crank shaft 1 of an engine and a multi-stage power transmitting gear arrangement 10 connected to an output end of the torque converter 2.

The torque converter 2 includes a pump impeller 3, a turbine runner 4 and a stator 5, and the pump impeller 3 is secured to the crank shaft 1. The stator 5 is coupled rotatably through a one-way clutch 6 with a fixed shaft 7 incorporated with a case 11 of the multi-stage power transmitting gear arrangement 10. The one-way clutch 6 permits the stator 5 to revolve only in a direction common to the rotation of the pump impeller 3.

The multi-stage power transmitting gear arrangement 10 includes a central shaft 12 which has one end thereof connected to the crank shaft 1 and elongates to pass through a central part of the arrangement 10 and engage at the other end thereof with an oil pump 100 disposed on a side wall of the arrangement 10. Further, a tubular turbine shaft 13 is disposed to surround the central shaft 12. One end of the tubular turbine shaft 13 is coupled with the turbine runner 4 and the other end of the tubular turbine shaft 13 reaches to the side wall of the arrangement 10 to be supported rotatably by the same.

On the tubular turbine shaft 13, a planetary gear unit 14 comprising a small sun gear 15, a large sun gear 16 disposed behind the small sun gear 15 with a short distance between, a long pinion gear 17, a short pinion gear 18 and a ring gear 19 is mounted. Further, first and second clutch devices 20 and 21 are disposed behind the planetary gear unit 14 on the tubular turbine shaft 13. The first clutch device 20 is provided for forward driving and operative to make selectively power transmission through a one-way clutch device 22 between the tubular turbine shaft 13 and the small sun gear 15. The second clutch device 21 is operative to making selectively another power transmission between the tubular turbine shaft 13 and the small sun gear 15. A first brake device 23 is disposed at the outside of the second clutch device 21. The first brake device 23 is formed into a band brake having a brake drum 23-1 connected to the large sun gear 16 and a brake band 23-2 engaged with the brake drum 23-1. A third clutch device 24 is disposed at the outside of the first clutch device 20 and on the side of the first brake device 23. The third clutch device 24 is provided for backward driving and operative to making selectively power transmission through the brake drum 23-1 of the first brake device 23 between the tubular turbine shaft 13 and the large sun gear 16.

At the outside of the planetary gear unit 14, a second brake device 25 is provided for engaging selectively a carrier 14a of the planetary gear unit 14 with a case 10a of the multi-stage power transmitting gear arrangement 10. Between the first and second brake devices 23 and 25, a second one-way clutch device 26 is provided in parallel with the second brake device 25 for engaging selectively the carrier 14a of the planetary gear unit 14 with the case 10a of the multi-stage power transmitting gear arrangement 10.

A fourth clutch device 27 is disposed in front of the planetary gear unit 14 for making selectively power transmission between the tubular turbine shaft 13 and the carrier 14a of the planetary gear unit 14. Further, an output gear 28 connected to the ring gear 19 is disposed in front of the fourth clutch device 27 to be coupled with an output shaft.

The tubular turbine shaft 13 is so arranged as to be coupled through a lock-up clutch device 29 with the crank shaft 1 without passing through the torque converter 2, as occasion demands.

The multi-stage power transmitting gear arrangement 10 constituted as described above provides four forward speeds and one backward speed, and the automatic transmission comprising the torque converter 2 and the multi-stage power transmitting gear arrangement 10 can provide a large number of speeds at a plurality of shift ranges arranged ordinarily by causing the first to fourth clutch devices 20, 21, 24 and 27, and the first and second brakes devices 23 and 25 to work selectively.

In the following Table 1, there are given the relationship in operation of the respective shift ranges with the clutches and the brakes in the above configuration:

TABLE 1

| Shift position | Clutch | | | | Brake | | One-way Clutch | |
|---|---|---|---|---|---|---|---|---|
| | 24 | 20 | 21 | 27 | 25 | 23 | 26 | 22 |
| P | | | | | | | - | |
| R | o | | | | o | | | |
| N | | | | | | | | |
| D first speed | | o | o | | | | (o) | (o) |
| second speed | | o | o | | | o | | (o) |
| third speed | | o | o | o | | | | (o) |
| overdrive | | | o | | | o | o | |
| 2nd first speed | | o | o | | | | (o) | (o) |
| second speed | | o | o | | | o | | (o) |
| third speed | | o | o | o | | | | (o) |
| 1st first speed | | o | o | | o | | (o) | (o) |
| second speed | | o | o | | | o | | (o) |

Figure 2:
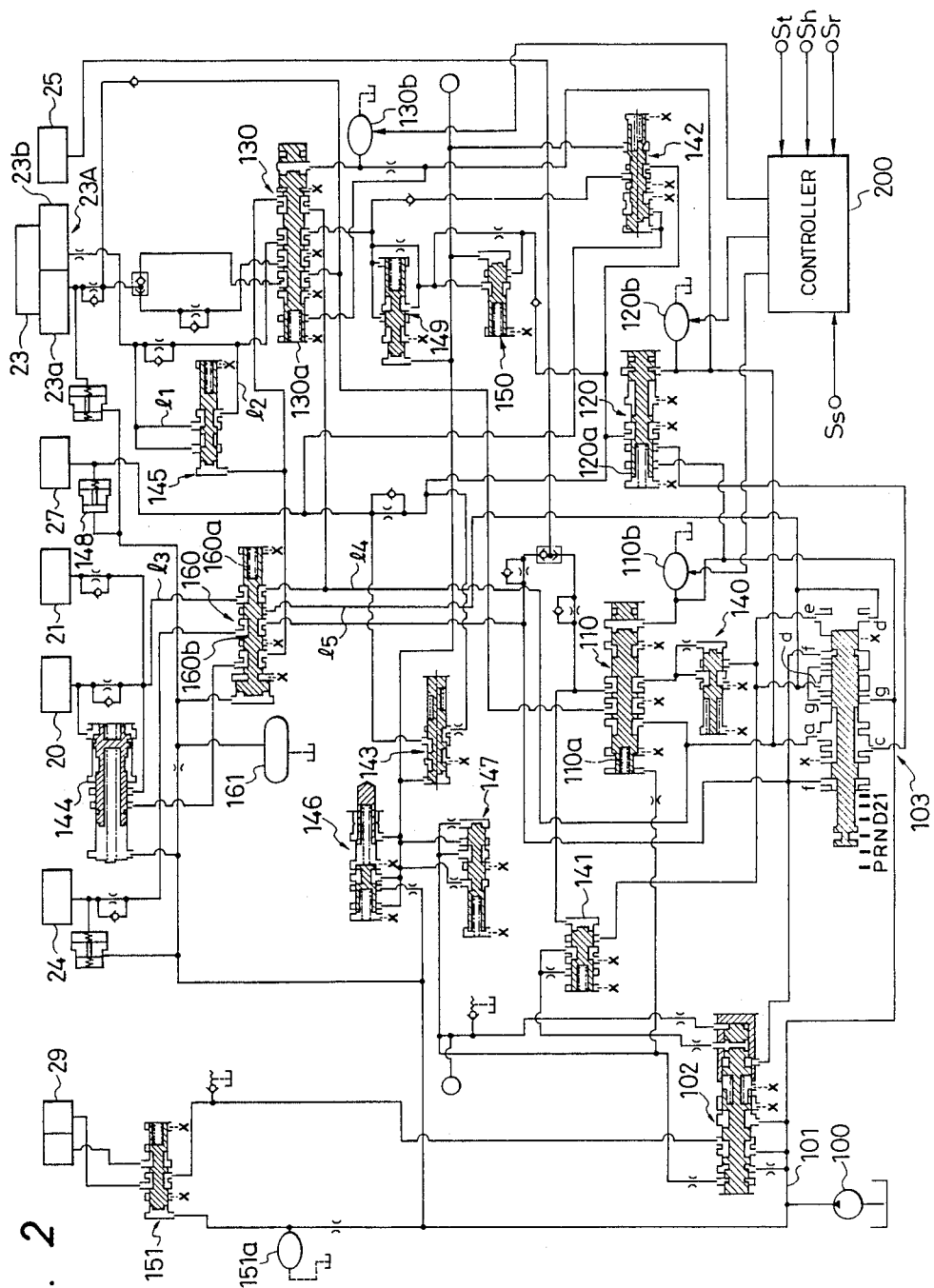
FIG. 2 is a sectional view showing an oil hydraulic control circuit of the automatic transmission to which the embodiment of control system according to the present invention is applied.

FIG. 2 shows an oil hydraulic control circuit used for the automatic transmission shown in FIG. 1 and described above.

The oil hydraulic control circuit includes an oil pump 100 adapted to be driven by the crank shaft 1 of the engine and an operation oil is discharged from the oil pump 100 into a pressure line 101. The operation oil discharged into the pressure line 101 is led to a pressure valve 102 to be adjusted in pressure thereby and then passed into a selector valve 103 through a port g thereof. The selector valve 103 is a manual shift valve having the 1st, 2nd, D, N, R and P shift positions to be selected manually and also ports a, c, d, e and f in addition to the port g. The port g is permitted to communicate with the ports a, d and e, when the selector valve 103 is in the 1st shift position, with the ports a, c and d when the selector valve 103 is in the 2nd shift position, with the ports a and c when the selector valve 103 is in the D shift position, and with the port f when the selector valve 103 is in the R shift position.

The port a of the selector valve 103 is connected to a 1-2 shift valve 110 for supplying thereto with the operation oil against a spring 110a provided therein. The 1-2 shift valve 110 is put in the 1st shift position when a solenoid valve 110b is deenergized and in the 2nd shift position when the solenoid valve 110b is energized. The operation oil discharged from the port a of the selector valve 103, for example, under the situation wherein the selector valve 103 is in the D shift position, is supplied through, the 1-2 shift valve 110 to an applying chamber 23a of a hydraulic servo control device 23A which is provided for causing the first brake device 23 to operate when the solenoid valve 110b is energized so that the speed change to the second speed from the third speed is carried out. In the case where the solenoid valve 110b is deenergized under the situation wherein the selector valve 103 is in the D shift position, the operation oil discharged from the port a of the selector valve 103 bypasses the 1-2 shift valve 110 to be supplied to the first and second clutch devices 20 and 21, so that the first speed is selected.

Further, the 1-2 shift valve 110 is operative to supply the operation oil which is introduced thereto through a pressure reducing valve 140 from the port e of the selector valve 103 to the second brake device 25 and also a signal pressure to throttle backup valve 141 when the second speed is selected under the situation wherein the selector valve 103 is in the 1st shift position.

The port a of the selector valve 103 is also connected to a 2-3 shift valve 120 for supplying thereto with the operation oil against a spring 120a provided therein. The 2-3 shift valve 120 is put in the 2nd shift position when a solenoid valve 120b is energized and in the 3rd shift position when the solenoid valve 120b is deenergized. In the case where the speed change to the third speed from the second speed is carried out, the operation oil discharged from the port c of the selector valve 103 is supplied through a servo control valve 142 and a 2-3 timing valve 143 to the fourth clutch device 27 to engage the same and also to the releasing chamber 23b of the hydraulic servo control device 23A so as to disengage the first brake device 23.

The port a of the selector valve 103 is further connected to a 3-4 shift valve 130 for supplying thereto with the operation oil against a spring 130a provided therein. The 3-4 shift valve 130 is put in the 3rd shift position when a solenoid valve 130b is deenergized and in the 4the shift position (overdrive position) when the solenoid valve 130b is energized. When the 3-4 shift valve 130 is in the 3rd shift position, the operation oil having passed through the 1-2 shift valve 110 is supplied to the applying chamber 23a of the hydraulic servo control device 23A without passing through any orifice and the operation oil discharged from the port a of the selector valve 103 to bypass the 1-2 shift valve 110 is supplied through the 3-4 shift valve 130 and an N-D accumulator 144 to the first and second clutch devices 20 and 21.

When the solenoid valve 130b is energized to drain the operation oil from the 3-4 shift valve 130, the operation oil having passed through the 1-2 shift valve 110 is supplied through a line provided with an orifice and a check valve to the applying chamber 23a of the hydraulic servo control device 23A, and the speed change to the fourth speed from the third speed is performed. Simultaneously, the operating oil in the releasing chamber 23b of the hydraulic servo control device 23A is drained through an orifice or a 3-4 cavity valve 145 and the 3-4 shift valve 130 so as to engage the first brake device 23, and the operating oil acting on the second clutch device 21 is also drained through the N-D accumulator 144, a neutral valve 160 and the 3-4 shift valve 130 so that the second clutch device 21 is disengaged.

The pressure reducing valve 140 receives the operation oil discharged from the port e of the selector valve 103 to reduce the pressure of the same by self-adjusting function and supplies the operation oil reduced in pressure to the 1-2 shift valve 110 when the selector valve 103 is in the 1st shift position. The operation oil thus supplied to the 1-2 shift valve 110 is supplied therethrough to the second brake device 25 when the first speed is selected. Since the operation oil which is supplied through the 1-2 shift valve 110 to the second brake device 25 is reduced in pressure by the pressure reducing valve 140, the shock caused on the occasion of the speed change is moderated. The pressure reducing valve 140 is operative also to supply the operation oil having passed through the 1-2 shift valve 110 to the throttle backup valve 141 as the signal pressure, but is not caused to work when the selector valve 103 is in the D shift position.

The throttle backup valve 141 receives the signal pressure from the pressure reducing valve 140 to cause the same to act against the pressure by a spring contained therein, and supplies the operation oil discharged from the port d of the selector valve 103 to the pressure regulator valve 102 only when the signal pressure supplied from the pressure reducing valve 140 acts practically against the pressure by the spring contained therein. Accordingly, the throttle backup valve 141 is operative to supply the operation oil discharged rom the port d of the selector valve 103 to the pressure regulator valve 102 for increasing the pressure of the operation oil so that an engine braking operation is obtained effectively when the selector valve 103 in the 1st or 2nd shifting position and in addition the signal pressure is not supplied to the throttle backup valve 141.

The pressure regulator valve 102 is connected through a throttle modulator valve 147 to a throttle valve 146. The throttle valve 146 works in conjunction with an accelerator so as to produce a hydraulic pressure in proportion to the opening degree of a throttle (hereinafter, referred to as the throttle opening degree). The throttle modulator valve 147 reduces appropriately the hydraulic pressure produced by the throttle valve 146 and supplies the reduced hydraulic pressure to the pressure regulator valve 102 so that a hydraulic pressure which matches the engine torque is obtained.

The servo control valve 142 and the 2-3 timing valve 143 are provided for moderating the shock arising on the occasion of the speed change to the third speed from the second speed. In the event of the speed change to the third speed from the second speed, it is required that the fourth clutch device 27 is engaged and the first brake device 23 is disengaged and therefore the operation oil is supplied to both the fourth clutch device 27 and the releasing chamber 23b of the hydraulic servo control device 23A. However, in such case, since an orifice and an accumulator 148 are provided in a line for supplying the operation oil to the fourth clutch device 27 for the purpose of reducing the shock resulting from the engagement of the fourth clutch device 27, the operation oil which is supplied to the fourth clutch device 27 is apt to be delayed to affect with a proper hydraulic pressure on the fourth clutch device 27 and therefore it is feared that the timing of the engagement of the fourth clutch device 27 is undesirably delayed. Accordingly, the servo control valve 142 is provided in a line for supplying the operation oil to the releasing chamber 23b of the hydraulic servo control device 23A so as to receive the hydraulic pressure from the fourth clutch device 27 and prevent the operation oil from acting to the releasing chamber 23b of the hydraulic servo control device 23A until the hydraulic pressure from the fourth clutch device 27 becomes relatively high.

The 2-3 timing valve 143 is operative to control the timing of the engagement of the fourth clutch device 27 in response to the throttle opening degree, so as to moderate the shock which is caused on the occasion on the speed change and unable to be moderated by the servo control valve 142. In fact, in the event of such a shift-up to the third speed from the second speed as arising when the throttle is returned quickly to reduce is opening degree at a relatively small opening degree, a quick engagement of the fourth clutch device 27 would give rise to a shock. In view of this, the 2-3 timing valve 143 is arranged for controlling the fourth clutch device 27 to have a relatively long engaging time when the throttle opening degree is small and a relatively short engaging time when the throttle opening degree is large.

The 3-4 capacity valve 145 is provided for moderating the shock arising on the occasion of the shift-up to the fourth speed from the third speed. When the operation oil in the 3-4 shift valve 130 is drained through the solenoid valve 130b which is energized so that the 3-4 shift valve 130 is shifted to the 4the shift position from the 3rd shift position and therefore the operation oil in the second clutch device 21 is drained through the N-D accumulator 144, the neutral valve 160 and the 3-4 shift valve 130 and the operation oil in the releasing chamber 23b of the hydraulic servo control device 23A is drained through the orifice or the 3-4 capacity valve 145 and the 3-4 shift valve 130. The drain of the operation oil from the releasing chamber 23b of the hydraulic servo control device 23A is controlled by the 3-4 capacity valve 145 so that the above mentioned shock is moderated. In the 3-4 capacity valve 145, a spool is placed at such a position as shown in FIG. 2 to connect a line $l_1$ with a line $l_2$ at the beginning of a period of the drain of the operation oil from the releasing chamber 23b because the hydraulic pressure of the operation oil drained from the second clutch device 21 is still relatively large and accordingly the hydraulic pressure acting upon the 3-4 capacity valve 145 is kept relatively large. Therefore, the operation oil from the releasing chamber 23b is drained through the 3-4 capacity valve 145. Then, when the drain of the operation oil from the releasing chamber 23b is advanced to a certain degree, the spool in the 3-4 capacity valve 145 is moved to the left in the drawing to disconnect the line $l_1$ from the line $l_2$ and accordingly the operation oil from the releasing chamber 23b is drained through an orifice. Under such a control by the 3-4 capacity valve 145, the hydraulic pressure in the releasing chamber 23b of the hydraulic servo control device 23A is reduced rapidly at the beginning of the period of the drain of the operation oil from the releasing chamber 23b and then further reduced gradually during that period of the drain. Consequently, the first brake device 23 is controlled by the hydraulic servo control device 23A to have has a relatively long engaging time, so that the shock resulting from the engagement of the first brake device 23 is moderated.

A 3-2 capacity valve 149 and a 3-2 timing valve 150 are provided for moderating the shock arising on the occasion of the shift-down to the second speed from the third speed in response to the throttle opening degree. In the 3-2 capacity valve 149, the hydraulic pressure from the throttle modulator valve 147 is applied to act against the total amount of the hydraulic pressure produced by a spring contained in the 3-2 capacity valve 149 and the hydraulic pressure of the drain of the operation oil from the releasing chamber 23b of the hydraulic servo control device 23A. Therefore, the drain of the operation oil from the releasing chamber 23b of the hydraulic servo control device 23A is controlled by the 3-2 capacity valve 149 in such a manner that the operation oil from the releasing chamber 23b is drained through the 3-2 capacity valve 149 at the beginning of the period of the drain of the operation oil from the releasing chamber 23b and then further drained through an orifice. The operation oil drained from the 3-2 capacity valve 149 is controlled through the 3-2 timing valve 150 by the 2-3 shift valve 120.

In the 3-2 timing valve 150, the hydraulic pressure from the throttle modulator valve 147 acts against the hydraulic pressure produced by a spring contained in the 3-2 timing valve 150. The operation oil having passed through or bypassed the 3-2 capacity valve 149 is drained through an orifice when the hydraulic pressure from the throttle modulator valve 147 is higher than the hydraulic pressure produced by the spring contained in the 3-2 timing valve 150 and drained through the 3-2 timing valve 150 when the hydraulic pressure from the throttle modulator valve 147 is equal to or lower than the hydraulic pressure produced by the spring contained in the 3-2 timing valve 150. In the situation wherein the hydraulic pressure from the throttle modulator valve 147 is higher than the hydraulic pressure produced by the spring contained in the 3-2 timing valve 150 and therefore the operation oil passes through the orifice, the operation oil from the releasing chamber 23b of the hydraulic servo control device 23A is drained gradually through the orifice. As a result, the first brake device 23 is controlled to have has a relatively long engaging time, so that the shock resulting from the engagement of the first brake device 23 is moderated.

The operation of each of the solenoid valves 110b, 120b and 130b are controlled by a controller 200 which is constituted with, for example, a microcomputer, in response to at least one of the operating condition of the engine and the travelling condition of the vehicle. The controller 200 is supplied with a turbine speed signal St obtained from a turbine speed sensor, throttle opening degree signal Sh obtained from a throttle sensor, shift position signal Sr obtained from a shift position sensor, and a vehicle speed signal Ss obtained from a speed sensor, to produces shift-up and shift-down signals selectively based on the signals St, Sh, Sr and Ss and forwards the shift-up or shift-down signal to the solenoid valves 110$b$, 120$b$ and 130$b$ when the speed change is carried out.

Further, for the purpose of moderating effectively the shock arising on the occasion of the speed change, for example, to the second speed from the third speed which is performed by causing the operation oil in the releasing chamber 23$b$ of the hydraulic servo control device 23A to be drained and also improving the responsibility for the timing of each speed change, the controller 200 is operative to supply a control signal obtained in response to, for example, the vehicle travelling speed to the solenoid valve 110$b$ when the third speed is selected in the multi-stage power transmitting gear arrangement 10, so as to cause the hydraulic servo control device 23A to be in a first condition wherein the operation oil is supplied to the releasing chamber 23$b$ thereof and in a second condition wherein the operation oil is drained from the releasing chamber 23$b$ thereof selectively in response to the travelling condition of the vehicle.

Figure 3:
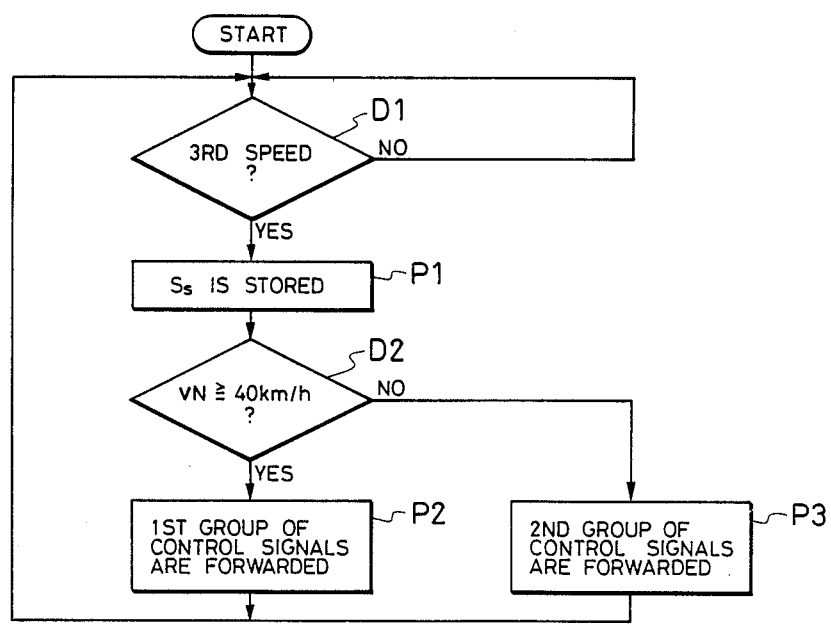
FIG. 3 is a flow chart showing an example of operational program for a microcomputer used in a controller employed in the oil hydraulic control circuit shown in FIG. 2.

FIG. 3 shows the flow of such control operation for supplying the control signal to the solenoid valve 110$b$ by the controller 200. In this control operation, first, it is checked based on the shift position signal Sr whether the third speed is selected in the multi-stage power transmitting gear arrangement 10 or not in decision D1. When the third speed is selected, the vehicle speed signal Ss is stored in process P1 and then it is checked based on the vehicle speed signal Ss whether a vehicle travelling speed VN is equal to or higher than 40 km/h or not in decision D2. To the contrary, if it is clarified in the decision D1 that the third speed in not selected in the multi-stage power transmitting gear arrangement 10, the check at the decision D1 is repeated.

When it is clarified in the decision D2 that the vehicle travelling speed VN is equal to or higher than 40 km/h, that is, the vehicle travels at high speed, a first group of control signals by which the solenoid valve 110$b$ is energized and both of the solenoid valves 120$b$ and 130$b$ are deenergized, as shown in Table 2, are forwarded to the solenoid valves 110$b$, 120$b$ and 130$b$,respectively, in process P2. On the other hand, if it is clarified in the desicion D2 that the vehicle travelling speed VN is lower than 40 km/h, that is, the vehicle travels at low speed, a second group of control signals by which the solenoid valves 110$b$, 120$b$ and 130$b$ are deenergized, as shown in Table 2, are forwarded to the solenoid valves 110$b$, 120$b$ and 130$b$, respectively, in process P3.

TABLE 2

|  | Solenoid valve 110b | Solenoid valve 120b | Solenoid valve 130b |
| --- | --- | --- | --- |
| First group of control signals | energized | deenergized | deenergized |
| Second group of control signals | deenergized | deenergized | deenergized |

As described above, when the vehicle travels at high speed (equal to or higher than 40 km/h) with the shift position selecting the third speed, the solenoid valve 110$b$ is energized so as to supply previously the operation oil to the applying chamber 23$a$ of the hydraulic servo control device 23A. Accordingly, the first brake device 23 can be engaged quickly when the solenoid valve 130$b$ is energized to cause the operation oil in the releasing chamber 23$b$ of the hydraulic servo control device 23A to be drained through the solenoid valve 130$b$ for the purpose of engaging the first brake device 23 so that the shift-down to the second speed from the third speed is carried out. Futher, when the vehicle travels at low speed (lower than 40 km/h) with the shift position selecting the third speed, the solenoid valve 110$b$ is deenergized so as to prevent the operation oil from being supplied therethrough to the applying chamber 23$a$ and cause the operation oil to be drained from the applying chamber 23$a$. Accordingly, the operation oil is commenced to be supplied to the applying chamber 23$a$ when the solenoid valve 110$b$ is turned to be energized for the shift-down to the second speed from the third speed and therefore the first brake device 23 has a relatively long engaging time so that the shock resulting from the engagement of the first brake device can be moderated effectively.

In such a control operation, the first brake device 23 is in its disengaging state regardless of the condition of the operation oil in the applying chamber 23$a$ when the operation oil is supplied to the releasing chamber 23$b$ and then changed to be in its engaging state when the operation oil is supplied to the applying chamber 23$a$ and simultaneously the operation oil in the releasing chamber 23$b$ is drained. In this connection, a period of time necessitated for completion of the engagement of the first brake device 23 is influenced to be varied in length by the presence or absence of the operation oil in the applying chamber 23$a$, and therefore the timing of the engagement of the first brake device 23 can be appropriately set by controlling the presence and absence of the operation oil in the applying chamber 23$a$ previously in response to the vehicle travelling speed.

Accordingly, with a control device which includes the controller 200 and the solenoid valve 110$b$ and is operative to cause the hydraulic servo control device 23A to be in the first condition wherein the operation oil is supplied to the applying chamber 23$a$ and in the second condition wherein the operation oil is drained from the applying chamber 23$a$ selectively in response to the vehicle travelling speed, a quick response to the speed change can be obtained when the vehicle travels at high speed and the shock caused on the occasion of the speed change can be effectively moderated when the vehicle travels at low speed.

Although the aforementioned control to the applying chamber 23$a$ of the hydraulic servo control device 23A is performed in response to the vehicle travelling speed, it is also possible to apply an engine load or the like representing the operating condition of the engine for the control in place of the vehicle travelling speed. In the control performed in response to the engine load, the operation oil is supplied to the applying chamber 23$a$ of the hydraulic servo control device 23A so that the quick response for the speed change is obtained when the engine load is relatively heavy and the operation oil in the applying chamber 23$a$ is drained so that the shock caused on the occasion of the speed change is moderated when the engine load is relatively light.

Further, the timing of the shift-up to the third speed from the second speed which caused with the operation oil supplied to the releasing chamber 23$b$ of the hydraulic servo control device 23A can be also appropriately controlled by selecting the condition of the operation oil in the applying chamber 23a of the hydraulic servo control device 23A.

In the embodiment shown in FIG. 2, the N-D accumulator 144 is provided to be connected with lines for supplying the operation oil to the first and second clutch devices 20 and 21 for delaying slightly the supply of the operation oil to the second clutch device 21 compared with the supply of the operation oil to the first clutch device 20. With such a control by the N-D accumulator 144, the second clutch device 21 is prevented from being engaged prior to the engagement of the first clutch device 20 and thereby worn abnormally when the selector valve 103 is moved to the D shift position from the N shift position under the situation wherein the throttle opening degree is rapidly increased.

Further, a lock-up control valve 151 is provided in a line for supplying the operation oil to the lock-up clutch diveice 29. In the lock-up control valve 151, the hydraulic pressure of the operating oil supplied through the line is applied to act against the total amount of the hydraulic pressure produced by a spring contained in the lock-up control valve 151 and the hydraulic pressure applied to the first clutch device 20. The lock-up clutch device 29 is provided with an applying chamber and a releasing chamber each connected to the lock-up control valve 151. When the operation oil in the releasing chamber of the lock-up clutch device 29 is drained through the lock-up control valve 151 controlled by a solenoid valve 151a which is in its energized state, the lock-up clutch device 29 is in the lock-up state.

What is claimed is:

1. A control system for an automatic transmission employed in a vehicle comprising:
    a torque converter coupled with an engine shaft of an engine,
    a power transmitting gear arrangement disposed at an output end of said torque converter for producing a plurality of speeds,
    speed change means for changing over power transmitting paths to one from another in said power transmitting gear arrangement to give rise to speed change,
    fluid servo control means having an applying chamber and a releasing chamber to each of which a fluid is supplied and operative selectively to cause said speed change means to be in a disengaging state, regardless of a condition of the fluid in the applying chamber, when the fluid is supplied to the releasing chamber,
    first additional control means for causing said releasing chamber of the fluid servo control means to be selectively in a first condition wherein the fluid is supplied to said releasing chamber and in a second condition wherein the fluid is drained from said releasing chamber, and
    second additional control means for causing said applying chamber of the fluid servo control means to be in a third condition wherein the fluid is supplied to said applying chamber and in a fourth condition wherein the fluid is drained from said applying chamber selectively in response to at least one of an operating condition of the engine and a traveling condition of the vehicle under a situation in which said releasing chamber is caused to be in said first condition by said first additional control means so as to result in the production of a predetermined one of said speeds by said power transmitting gear arrangement.

2. A control system according to claim 1, wherein said second additional control means comprises control valve means for supplying the fluid to said applying chamber when the vehicle travels at relatively high speed and for draining the fluid from said applying chamber when the vehicle travels at relatively low speed.

3. A control system according to claim 1, wherein said second additional control means comprises control valve means for supplying the fluid to said applying chamber when the engine operates with a relatively heavy engine load and for draining the fluid from said applying chamber when the engine operates with a relatively light engine load.

4. A control system according to claim 1, wherein said fluid servo control means is operative to cause said speed change means to select another one of said speeds in said power transmitting gear arrangement which is lower than said predetermined one of speeds when said applying chamber is in said third condition and said releasing chamber is in said second condition.

5. A control system according to claim 4, wherein said speed change means comprises a plurality of clutch devices and a plurality of brake devices for making four forward speeds selectively in said power transmitting gear arrangement, said four forward speeds including said predetermined one of said speeds and another one of speeds, and said second additional control means comprises a portion thereof including three solenoid valves for causing said speed change means to make selected one of said four forward speeds, one of said three solenoid valves being unconcerned in making said predetermined one of speeds and used for causing said fluid servo control means to be in said first and second conditions selectively.

6. A control system according to claim 5, wherein said predetermined one of said speeds is the third one of said four forward speeds and said fluid servo control means is operative to participate in making each of the second one and fourth one of said four forward speeds.

7. A control system according to claim 4, wherein said second additional control mean comprises first checking means for checking whether said predetermined one of said speeds is selected in said power transmitting gear arrangement or not, signal storing means for storing a vehicle speed signal when it is clarified by said first checking means that the predetermined one of said speeds is selected in said power transmitting gear arrangement, second checking means for checking whether a vehicle travelling speed detected based on said vehicle speed signal is lower than a predetermined speed or not, and control signal supplying means for supplying a first control signal for causing said fluid servo control means to be in said first condition when it is clarified by said second checking means that the vehicle travelling speed is not lower than the predetermined speed and for supplying a second control signal for causing said fluid servo control means to be in said second condition when it is clarified by said second checking means that the vehicle travelling speed is lower than the predetermined speed.

8. A control system for an automatic transmission employed in a vehicle comprising:
    a torque converter coupled with an engine shaft of an engine, a power transmitting gear arrangement disposed at an output end of said torque converter for producing a plurality of speeds, speed change means for changing over power transmitting paths to one from another in said power transmitting gear arrangement to give rise to speed change, fluid servo control means having an applying chamber and a releasing chamber to each of which a fluid is supplied and operative selectively to cause said speed change means to be in a disengaging state, regardless of a condition of the fluid in the applying chamber, when the fluid is supplied to the releasing chamber, first additional control means for causing said releasing chamber of the fluid servo control means to be selectively in a first condition wherein the fluid is supplied to said releasing chamber and in a second condition wherein the fluid is drained from said releasing chamber, second additional control means for causing said applying chamber of the fluid servo control means to be in a third condition wherein the fluid is supplied to said applying chamber and in a fourth condition wherein the fluid is drained from said applying chamber selectively in response to at least one of an operating condition of the engine and a traveling condition of the vehicle under a situation in which said releasing chamber is caused to be in said first condition by said first additional control means so as to produce a predetermined one of said speeds by said power transmitting gear arrangement, and a plurality of solenoid valves, each of which is operative to participate in a selected speed change and not in others, at least one of said solenoid valves which is in such a condition as not to participate in the selected speed change being used for controlling the fluid in relation to said applying chamber of the fluid servo control means.

* * * * *